(No Model.)
10 Sheets—Sheet 1.
J. WALRATH.
EXPLOSIVE GAS ENGINE.
No. 522,811. Patented July 10, 1894.
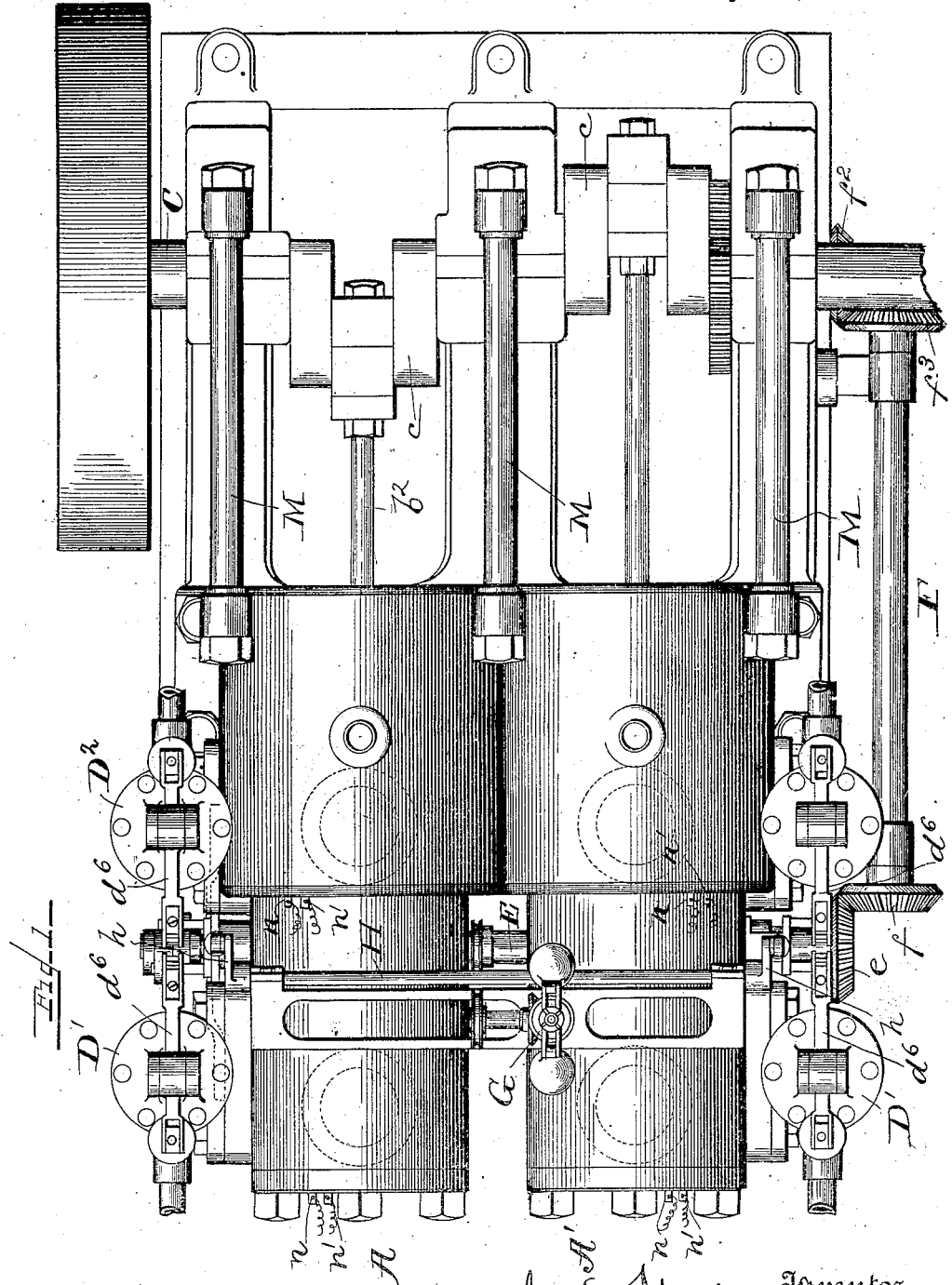

(No Model.) 10 Sheets—Sheet 2.
J. WALRATH.
EXPLOSIVE GAS ENGINE.
No. 522,811. Patented July 10, 1894.
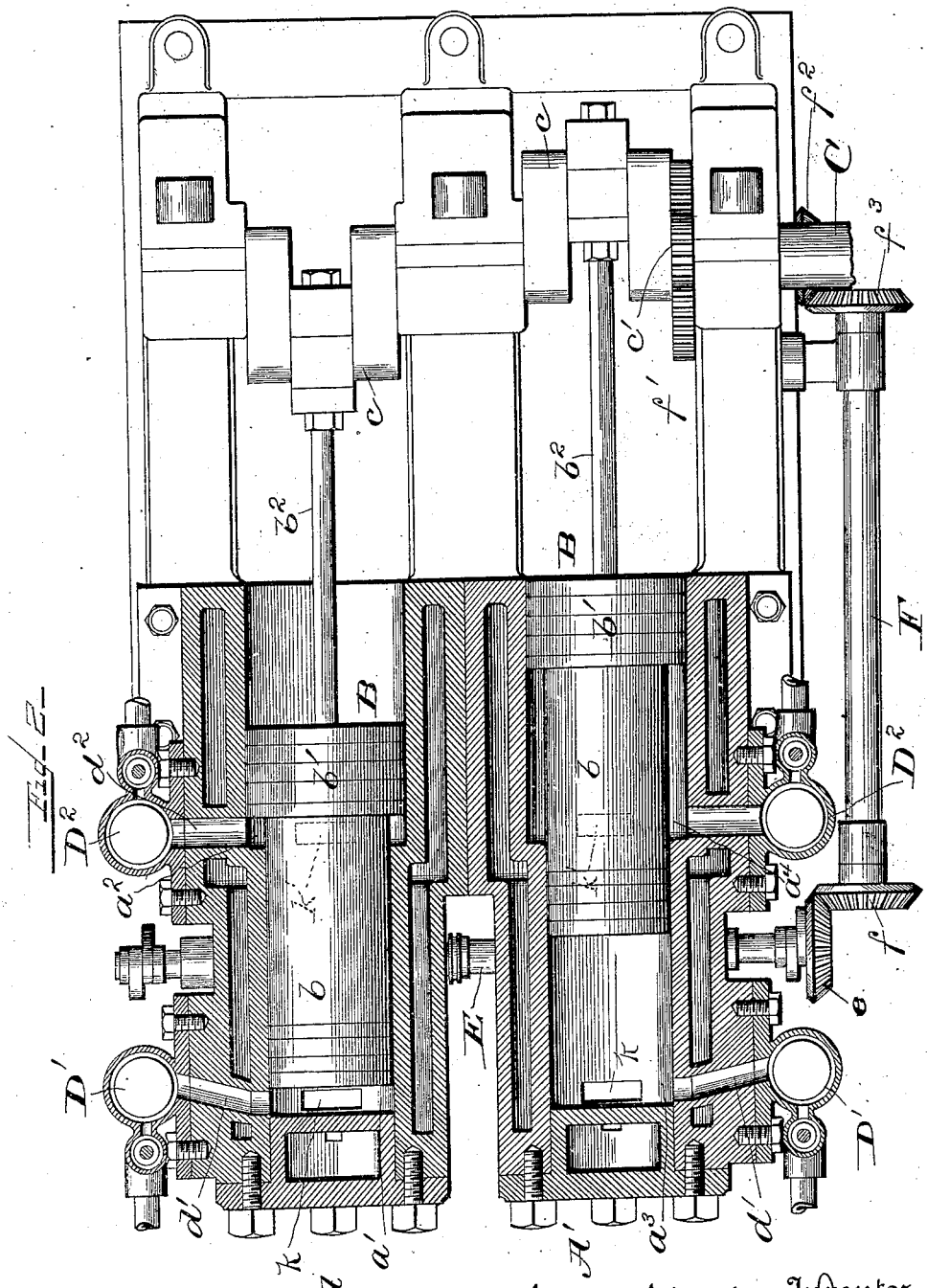

(No Model.) 10 Sheets—Sheet 3.
J. WALRATH.
EXPLOSIVE GAS ENGINE.
No. 522,811. Patented July 10, 1894.
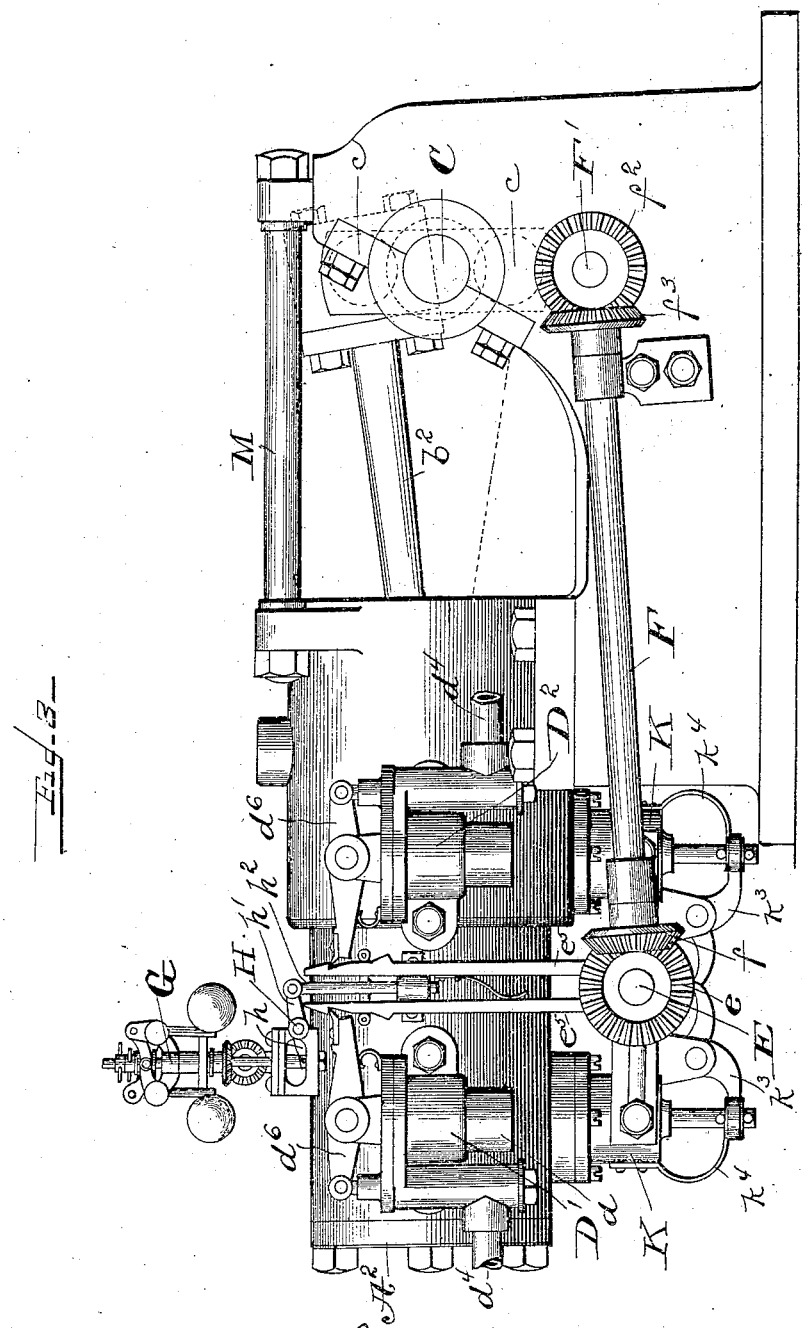
Witnesses
Inventor
Jesse Walrath
By Whitaker Prevost Attorneys.

(No Model.)
10 Sheets—Sheet 4.
J. WALRATH.
EXPLOSIVE GAS ENGINE.
No. 522,811.
Patented July 10, 1894.
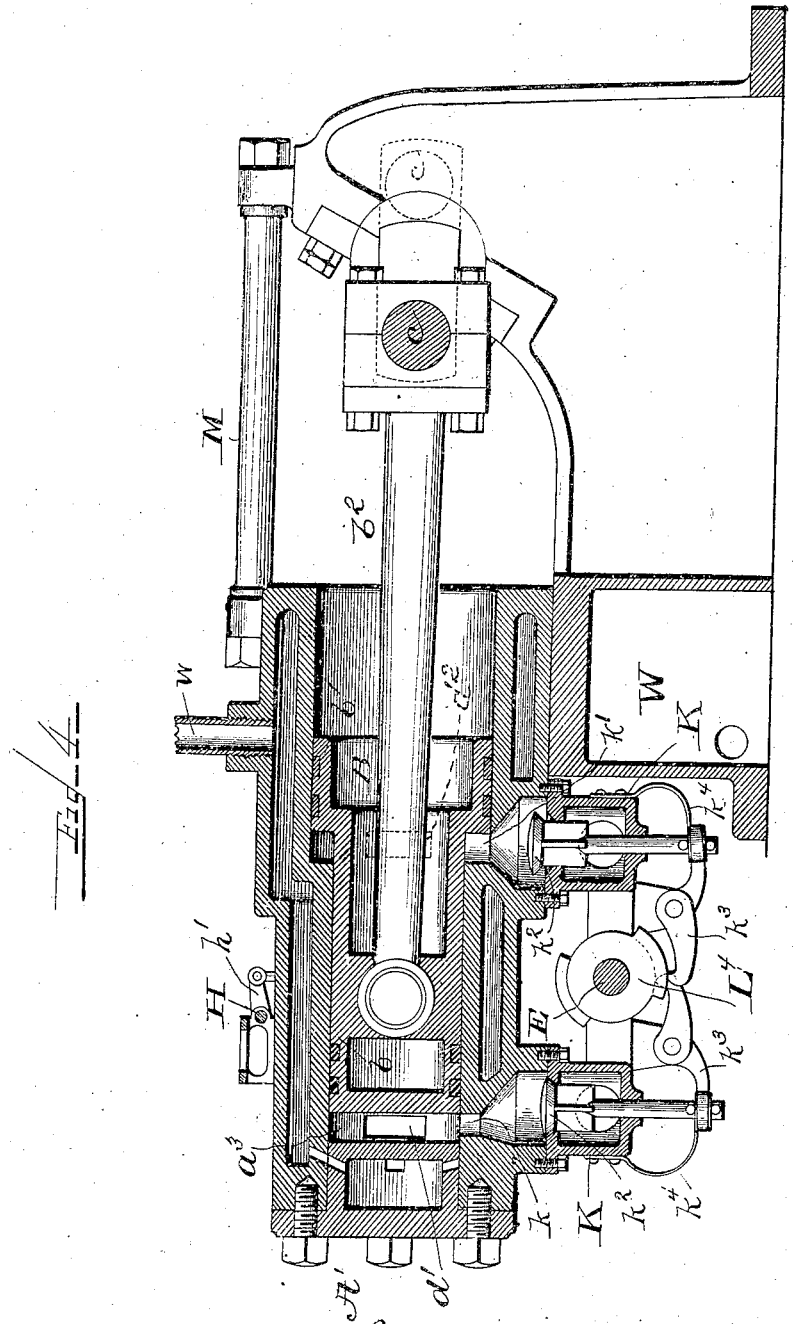

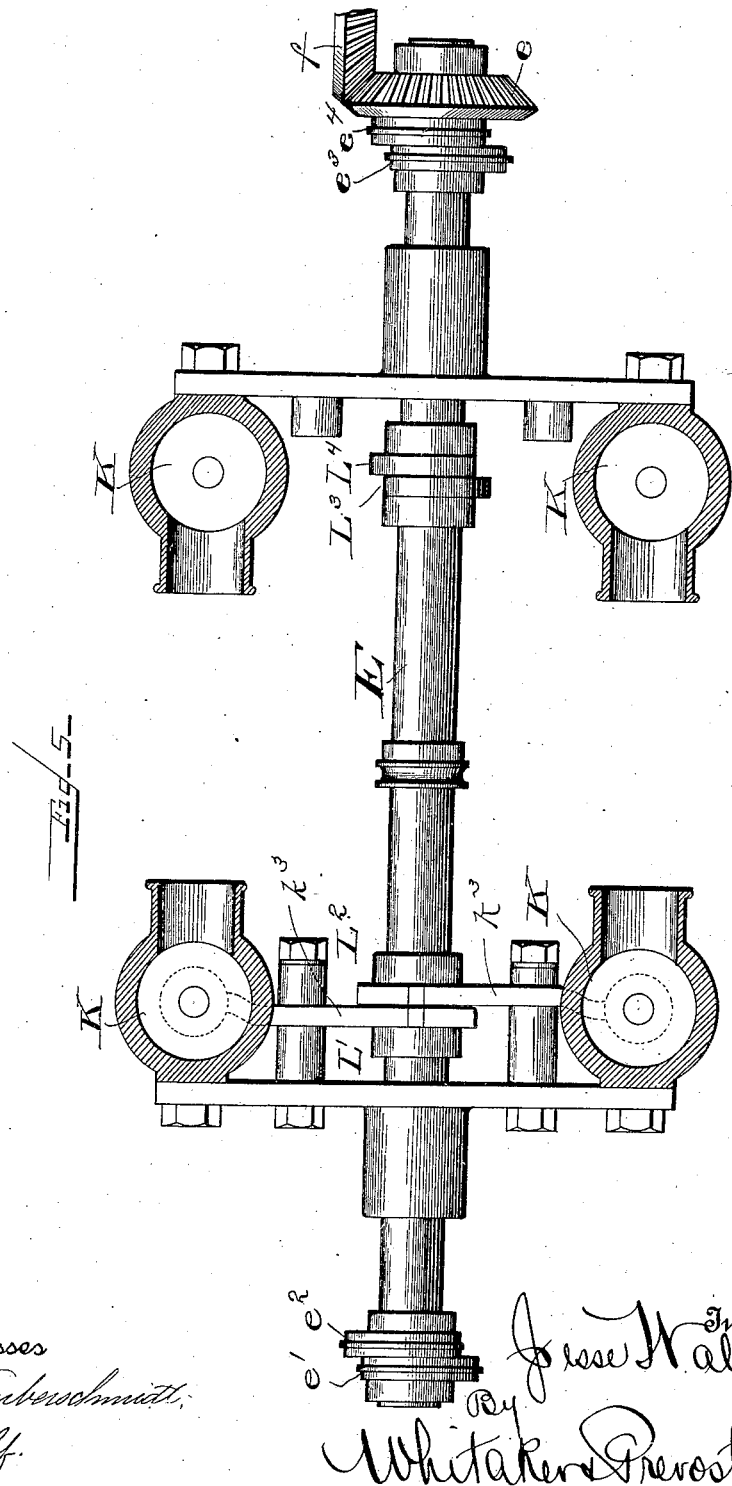

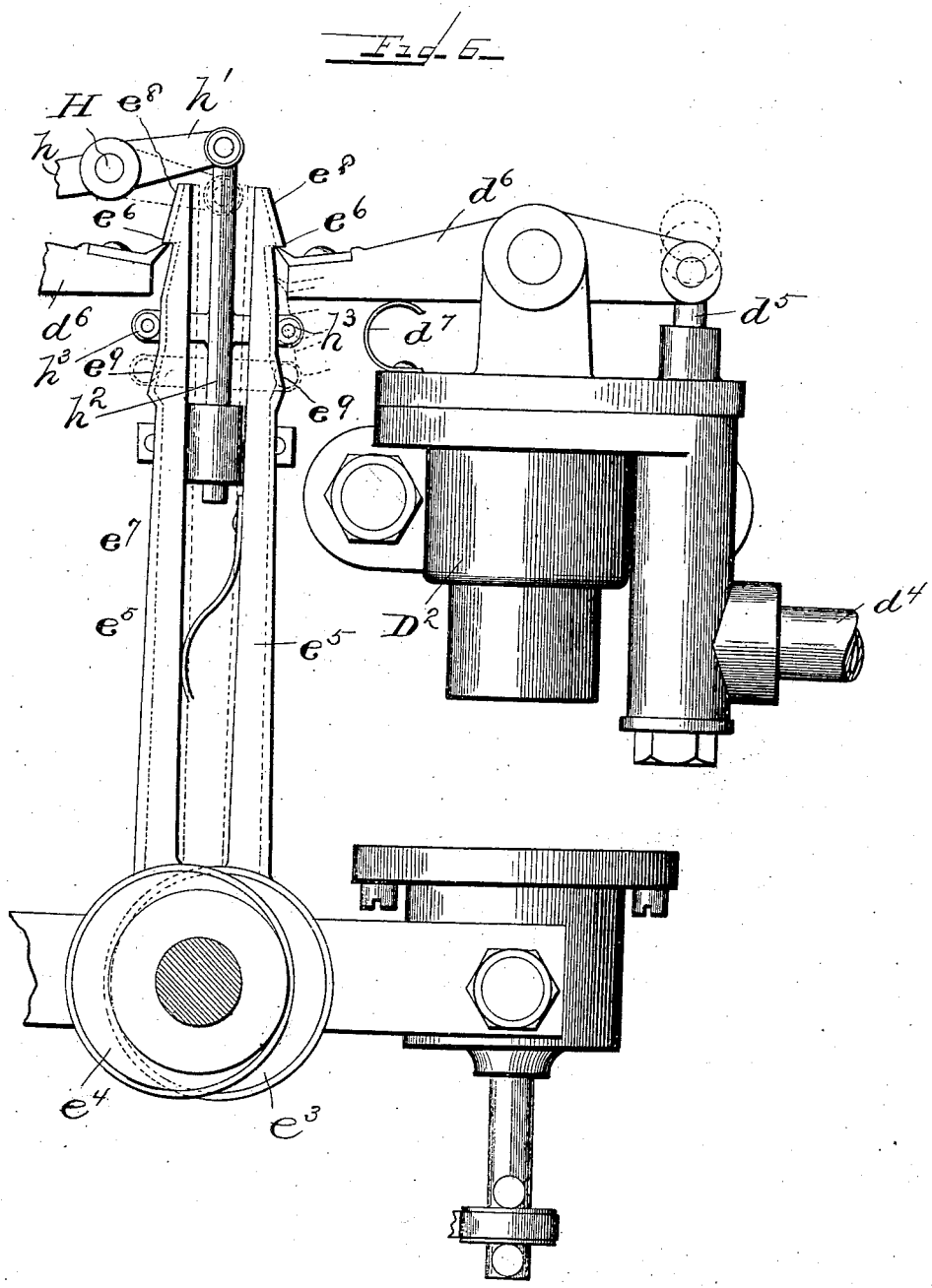

(No Model.)
J. WALRATH.
EXPLOSIVE GAS ENGINE.
No. 522,811.   Patented July 10, 1894.
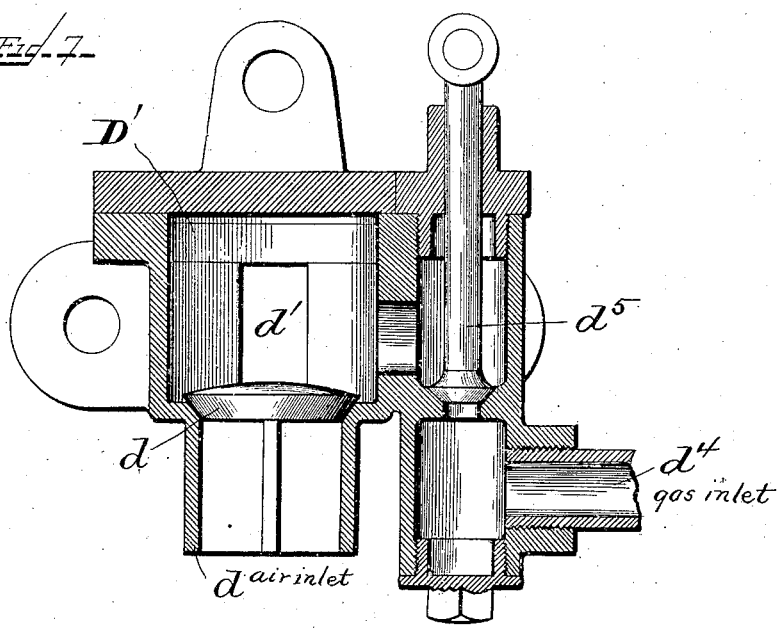
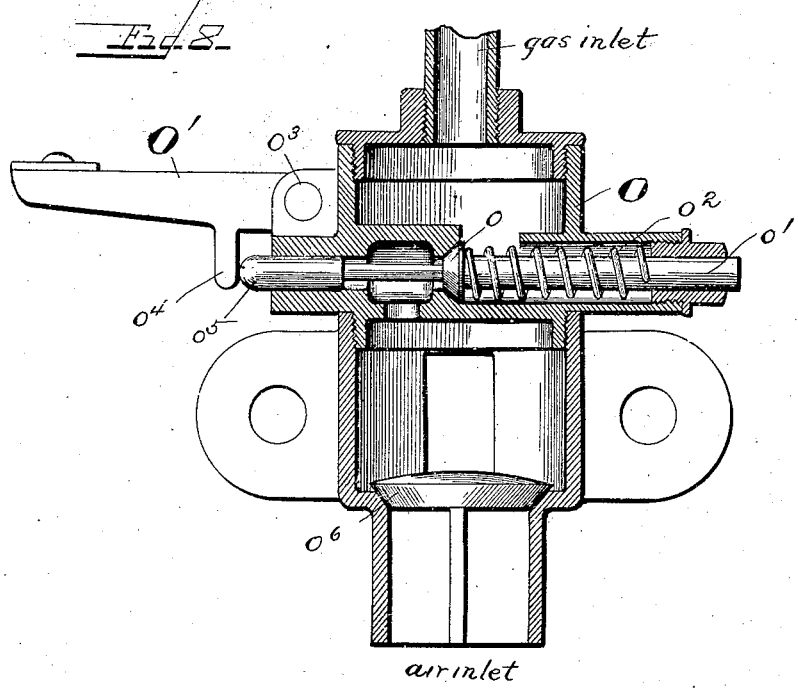
Witnesses
D. A. Vauberschmidt.
E. Holf.
Inventor
Jesse Walrath
By Whitaker Prevost   Attorneys (No Model.)
10 Sheets—Sheet 8.

J. WALRATH.
EXPLOSIVE GAS ENGINE.

No. 522,811.  Patented July 10, 1894.

Witnesses
G. A. Taubenschmidt,
E. Wolf

Inventor
Jesse Walrath
by Whitaker & Prevost
Attorneys (No Model.) 10 Sheets—Sheet 7.
J. WALRATH.
EXPLOSIVE GAS ENGINE.
No. 522,811. Patented July 10, 1894.
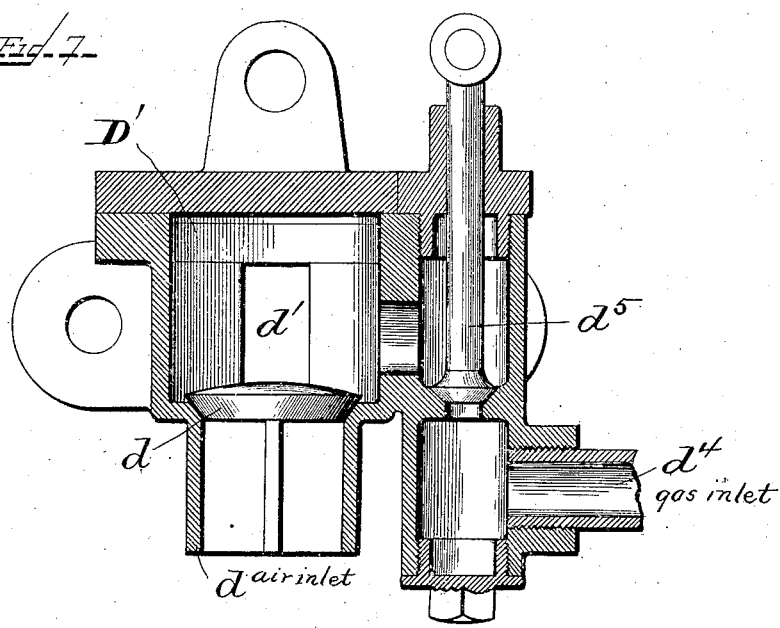
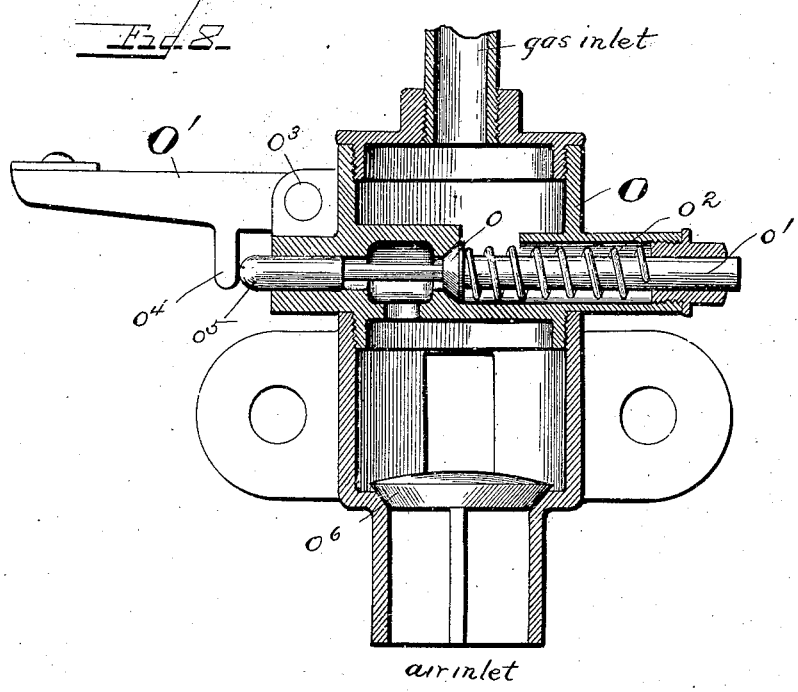

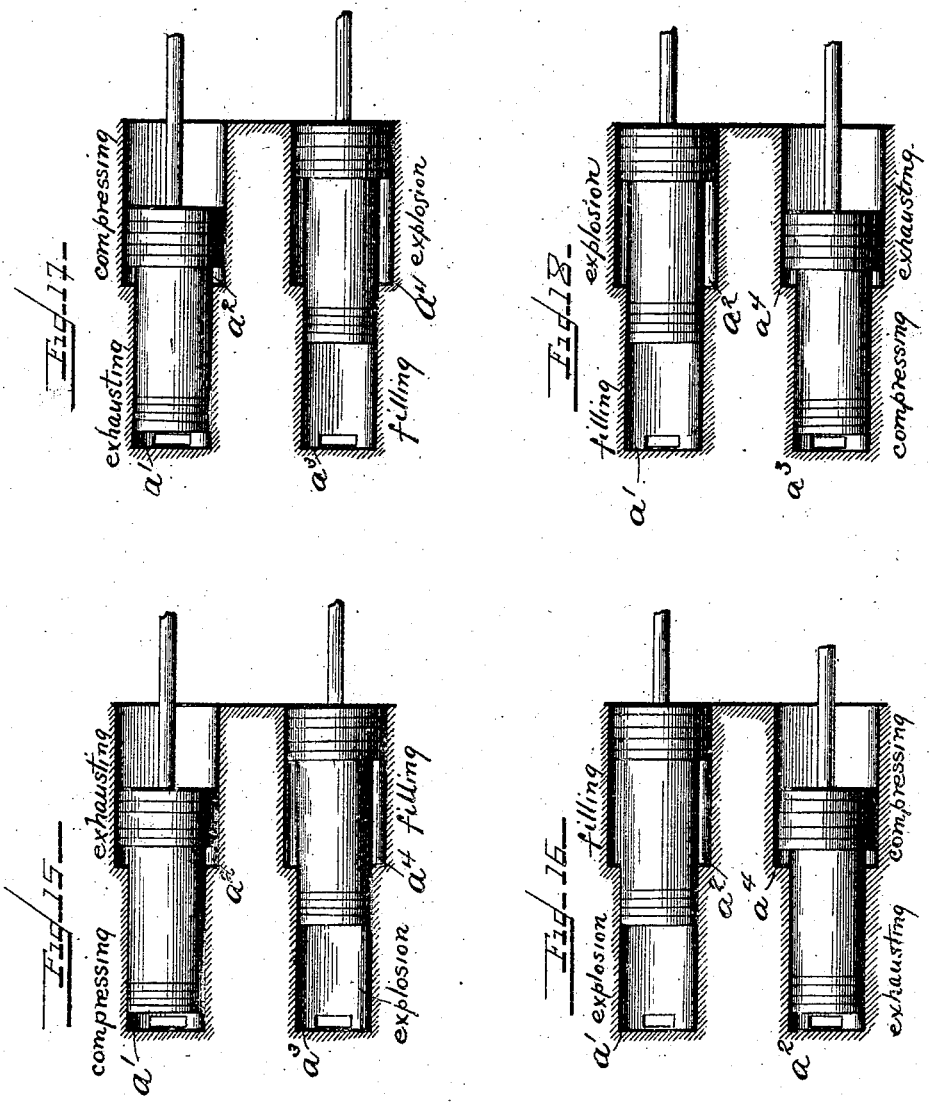

UNITED STATES PATENT OFFICE.

JESSE WALRATH, OF RACINE, WISCONSIN.

EXPLOSIVE GAS-ENGINE.

SPECIFICATION forming part of Letters Patent No. 522,811, dated July 10, 1894.

Application filed May 2, 1893. Serial No. 472,681. (No model.)

*To all whom it may concern:*

Be it known that I, JESSE WALRATH, a citizen of the United States, residing at Racine, in the county of Racine and State of Wisconsin, have invented certain new and useful Improvements in Explosive Gas-Engines; and I do hereby declare the following to be a full, clear, and exact description of the invention, such as will enable others skilled in the art to which it appertains to make and use the same.

My invention is an improvement in gas engines and consists in the novel features hereinafter fully described reference being had to the accompanying drawings which illustrate one form in which I have contemplated embodying my invention, and said invention is fully disclosed in the following description and claims.

Figure 9:
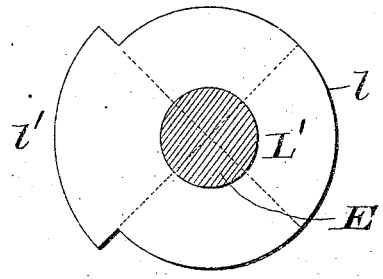
Figure 10:
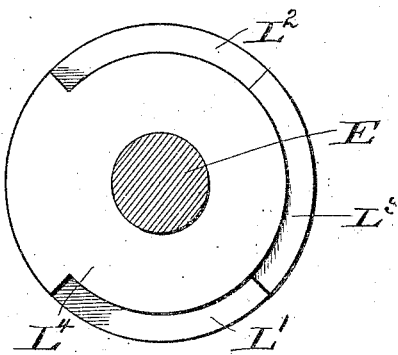
Figure 11:
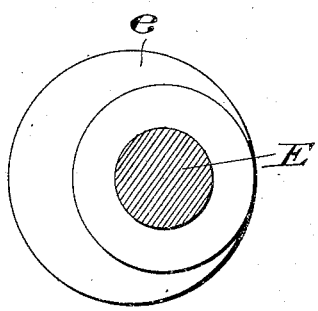
Figure 12:
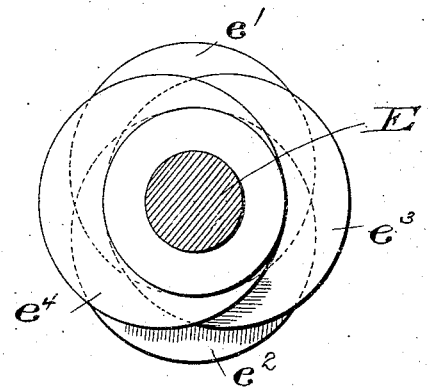

Referring to the said drawings, Figure 1 represents a top plan view of a gas engine embodying my invention. Fig. 2 represents a horizontal section of the same. Fig. 3 shows a side elevation of the engine. Fig. 4 is a central vertical longitudinal section through one of the engine cylinders. Fig. 5 is a plan view of the controlling shaft for operating the inlet and exhaust valves. Fig. 6 is an enlarged detail view of the mechanism for controlling the inlet valves. Fig. 7 is a detail sectional view of one of the gas and air inlets and the controlling valves therefor. Fig. 8 is a similar view showing a slightly modified construction. Fig. 9 is a detail view of one of the cams for controlling the exhaust ports. Fig. 10 is a view showing in section the shaft upon which the cams are mounted and illustrating the relative positions of the several cams. Fig. 11 is a detail of one of the eccentrics for operating the gas inlet valves. Fig. 12 is a similar view illustrating the relative positions of the several eccentrics. Figs. 13 and 14 are detail views of the devices for igniting the explosive mixture in the different explosion chambers. Figs. 15, 16, 17, and 18 are diagrammatic views indicating the positions of the different pistons, and the operations taking place in their respective cylinders, at each step in the cycle of movements produced by the engine.

In carrying my invention into effect I employ two double cylinders, each of which is provided with two chambers in which the explosive mixture is drawn in, compressed, exploded and exhausted. These two chambers are of unequal diameters and are connected end to end as will be seen from the drawings. Each double cylinder is provided with a piston having a portion working in each chamber. For convenience of description I prefer to treat the construction as if there were two small cylinders and two cylinders of larger area, each provided with a piston working therein.

Referring to the drawings A A' represent the two double cylinders provided with the small cylinders or chambers $a'$, $a^3$, and the cylinders of larger area $a^2$ $a^4$, as clearly indicated in Fig. 2. The double pistons B B have each a portion $b$ working in one of the small cylinders $a'$ $a^3$ and a portion $b'$ working in one of the cylinders $a^2$ $a^4$. The double pistons are connected to the cranks $c$ $c$ of the driving shaft C by means of the piston rods $b^2$ $b^2$ in the usual manner, and the crank or driving shaft is furnished with a small balance wheel, one of the objects of my invention being to dispense with the large, and extremely heavy balance wheels which are commonly necessary in gas engines of ordinary construction.

The construction of the double cylinders A A' and the parts connected therewith being exactly alike, a description of one of said double cylinders and its adjuncts will be sufficient.

The double cylinder A is provided with a water jacket in the usual manner for cooling the walls of the chambers after explosions, and in order to keep up a circulation of the water I provide the base of the machine with a water receptacle W (see Fig. 4) and connect the upper part of each water jacket with the reservoir by a pipe $w$, or I may provide for supplying water in some other manner if preferred.

At one side of the double cylinder A are the inlet ports $d'$ $d^2$, the port $d'$ leading into the small cylinder $a'$ and the port $d^2$ leading into the large cylinder $a^2$. The outer ends of these ports or inlet passages communicate with valve casings D' D² respectively which are provided with valves for controlling the admission of gas and air to the cylinders at the proper time. One of these valve casings is shown enlarged in Fig. 7; $d$ represents the air inlet aperture closed by a check valve $d^3$ and $d^4$ represents the gas inlet pipe controlled by a valve $d^5$ the stem of which passes up through the top of the casing and is connected with one end of an operating lever $d^6$ pivoted intermediate its ends to a projection from the top of the casing as shown best in Figs. 3 and 6. The operating levers of the two valve casings secured to one cylinder, extend to within a short distance from each other as shown in Fig. 3.

Beneath the cylinders a transverse shaft E, which I term the valve operating shaft, is mounted in suitable bearings and driven from the driving shaft. In this instance the valve operating shaft E is provided at one end with a bevel gear $e$ (see Figs. 1 and 3) which meshes with a gear $f$ on a longitudinally disposed shaft F. The driving shaft is provided with a pinion $c'$ which gears with a larger gear wheel $f'$ on a short shaft F' which is provided with a bevel gear $f^2$ meshing with a gear $f^3$ in the shaft F. The parts are so constructed and arranged that the valve operating shaft makes one complete revolution for two complete revolutions of the driving shaft caused by four out strokes of the pistons. On the valve controlling shaft are four eccentrics $e'$ $e^2$ $e^3$ $e^4$ which control the operation of the gas and air inlet ports of the four cylinders, two of such eccentrics being located at each side of the machine. Each eccentric operates an eccentric rod which is disposed vertically and has its upper end provided with a hook or shoulder $e^6$ for engaging one end of one of the valve operating levers $d^6$, above which is an incline $e^8$. Reference being had to Fig. 6, it will be seen that as the shaft revolves, the eccentric will cause the eccentric rod $e^5$ to draw down the end of the lever $d^6$ until the lever slips out of engagement with the hook or shoulder $e^6$ of said eccentric rod, when a spring $d^7$ will restore the lever $d^6$ to its normal position and close the valve, this it will do when the lever $d^6$ has been drawn down to the lowest position indicated in dotted lines in Fig. 6. When the eccentric rises the incline $e^8$ will engage the end of the lever $d^6$ and pass upward until the hook $e^6$ operatively engages the lever. The eccentrics are mounted upon the valve actuating shaft E in such a manner that one valve will be opened at each quarter revolution of the shaft to admit gas and air to its cylinder. Figs. 11 and 12 illustrate the construction of the eccentrics and their arrangement upon the shaft.

Upon the upper part of the machine is mounted a governor G of any usual or preferred construction, which is operatively connected with an arm $h$ on a rock shaft H. The rock shaft H is provided adjacent to each end with an arm $h'$ to which is attached a vertical slide $h^2$ (see Figs. 3 and 6) having its lower end mounted in a guide, and being provided with laterally extending arms carrying studs or friction rolls, $h^3$, which engage the outer edges of the vertical eccentric rods $e^5$. A spring $e^7$ which is in this instance secured to one of the eccentric rods, forces the said rods away from each other and holds them against the friction rolls $h^3$. The governor is operated by a belt from a pulley $E^x$ on the shaft E as will be seen from Figs. 1, 2 and 5. When the machine is started the governor balls are in their lowest positions and the friction rolls $h^3$ are in the position shown in full lines in Fig. 6. The eccentrics will therefore operate to pull down the levers $d^6$ and open the valves to the greatest possible extent to allow a large amount of gas to flow into the chambers. After the machine has been in operation a few moments the governor balls will rise and thereby depress the friction rolls $h^3$ which will engage inclined portions $e^9$ on the eccentric rods, as shown in Fig. 6 and force said rods inward thereby lessening the extent of engagement of the hooks $e^6$ and the lever $d^6$ so that when one of said eccentric rods is drawn downward it will slip off of the end of the lever before it has drawn said lever down very far as indicated in the middle position (shown in dotted lines) in Fig. 6, thus opening the valve a less amount and permitting a less amount of explosive mixture to enter the chamber connected therewith. It will thus be seen that the governor will control the amount of gas admitted to the several chambers, so as to allow only the amount of explosive mixture to be used for each explosion necessary to maintain a uniform speed and power.

Each double cylinder is provided with two exhaust ports as shown in Figs. 2 and 4, one $k$ communicating with the smaller cylinder and the other $k'$ communicating with the larger cylinder. Each exhaust port opens into a valve casing K fitted with a suitable valve $k^2$ which controls the exhaust opening. The stem of the valve $k^2$ extends through the casing and is engaged by one end of a tappet or lever $k^3$ the other end of which engages a cam on the shaft E. There are four of these cams, $L'$ $L^2$ $L^3$ $L^4$ for operating the exhaust valves, one for each valve, and each cam is preferably shaped as shown in Fig. 9. The cam has three quarters of its periphery concentric with the shaft as indicated at $l$ while the other quarter is provided with a raised cam surface $l'$. In operation each cam permits its valve to remain closed during three quarters of the revolution of the cam shaft and during the last quarter said raised surface $l'$ will operate the lever $k^3$ and elevate the valve to permit the exhaust from its corresponding cylinder to take place. The four cams $L'$ $L^2$ $L^3$ $L^4$ are arranged upon the shaft E as indicated in Fig. 10, so that one of the levers $k^3$ will always be acted upon by its cam, and at every quarter revolution of the shaft one exhaust valve will close and another open, causing the four exhaust valves to open for one quarter of a revolution in succession, one only being open at a time.

Fig. 5 shows a plan view of the shaft E and illustrates the arrangement of the cams and exhaust valves, also the eccentrics $e'$ $e^2$ $e^3$ $e^4$ which control the inlet ports. This construction is also shown clearly in Fig. 4. Each valve $k^2$ is provided with a spring $k^4$ which keeps the valve upon its seat unless it is being acted upon by its controlling cam.

The frame of the machine is made to support the various parts and I prefer to provide the frame with tie rods M M as shown in Figs. 1, 3, and 4, to resist the strain caused by the explosions in the cylinders.

I prefer to employ electric devices for igniting the explosive mixture successively in the four cylinders, and to this end each cylinder $a'$ $a^2$ $a^3$ $a^4$ is provided with a pair of electrodes $n$ $n'$ as indicated in Fig. 1, of any preferred form, to which wires are attached which connect them with a source of electricity as a battery and induction coil (not shown) which will produce a spark. I provide the valve controlling shaft E with an electric controlling device electrically connected with said source of electricity and with the said electrodes so that a spark will be produced in each of the cylinders in succession for each revolution of the shaft. The devices which I have shown for this purpose are illustrated in Figs. 13 and 14. A stationary disk N surrounds the shaft E and is provided with four pairs of suitable plugs $n^2$ $n^2$ to which the wires of the various circuits are connected. The shaft is provided with an arm N' to which are secured brushes $n^3$ $n^3$ in position to be passed over the four pairs of plugs in succession and thereby cause a spark to be produced in each of the four cylinders, as will be readily understood.

Having set forth in detail the construction of the various parts of the apparatus I will proceed to describe the operation of the engine, tracing the operations which take place in the various cylinders during one complete cycle of movements, which produce four out strokes of the pistons, two revolutions of the driving shaft and one revolution of the valve operating shaft. In Figs. 15, 16, 17, and 18, I have diagrammatically illustrated the positions of the pistons and the operations attendant upon each step in the cycle of movements.

Supposing the parts to be in the position shown in Fig. 15, the machine in order to be started has been operated by hand to draw a charge of explosive mixture into the cylinder $a^3$ and compress it therein. As the piston in cylinder $a^3$ moves rearward to compress the gas therein previous to the explosion, a charge of the explosive mixture has been admitted into the cylinder $a'$. The electrical controlling devices just described will at this moment cause a spark in cylinder $a^3$ which will explode the charge and force out the piston as shown in Fig. 15. As the piston moves outward a partial vacuum is formed in cylinder $a^4$ and at this moment the valve controlling the gas supply for this cylinder is opened by means of the eccentric and eccentric rod as before described. Reference being had to Figs. 3, and 7, it will be seen that as soon as the vacuum is formed and the valve opened, gas and air will pass into the cylinder, the gas through the inlet pipe $d^4$ and the air by lifting the check valve $d^3$ in the inlet $d$. Returning to Fig. 15, it will be seen that the explosion in cylinder $a^3$ also forces the piston working in cylinders $a'$ $a^2$ inward thereby compressing the gas already drawn into the cylinder $a'$. The next explosion takes place in cylinder $a'$, as indicated in Fig. 16, driving the pistons in cylinders $a'$ $a^2$ outward and drawing a charge of air and gas into the cylinder $a^3$, in the manner previously described with reference to cylinder $a^4$. The piston in cylinders $a^3$ $a^4$ will be forced inward by the explosion in cylinder $a'$ and at the moment before it begins its rearward movement, the exhaust valve communicating with cylinder $a^3$ will be opened, the gas inlet valve having been already closed by the hook on the eccentric rod slipping off of the valve operating lever as before described. As the piston moves rearward therefore the gas in cylinder $a^4$ will be compressed, while the exploded vapor in the cylinder $a^3$ will be forced out through the exhaust valve. These operations it will be observed are positively accomplished by the out stroke of the other piston. The next explosion takes place in cylinder $a^4$ as indicated in Fig. 17, forcing the piston out and drawing a charge into the cylinder $a^3$ while the return movement of the other piston compresses the charge in the cylinder $a^2$ and expels the exploded gases in the cylinder $a'$. The next explosion takes place in the cylinder $a^2$ as shown in Fig. 18, drawing a charge into the cylinder $a'$ compressing a charge in cylinder $a^3$ and driving out the exploded gases in chamber $a^4$ when the cycle of movements is repeated. It will be thus observed that the four explosions each produce one stroke of one of the pistons and one-half revolution of the crank or driving shaft. Thus the four explosions produce two revolutions of the driving shaft and a single revolution of the valve operating shaft as before described. It will be observed that the operations of filling, compressing, exploding and exhausting take place in each cylinder in succession and the compression and the exhaustion in one cylinder are produced by positive movements in one of the other cylinders and not by the balance wheel. In this construction therefore where an impulse is given to the driving shaft at each half revolution of the shaft, I am enabled to use a very small and light balance wheel instead of the large heavy wheels which are ordinarily employed and the power will thus be more directly and economically applied.

In Fig. 8 I have illustrated a slightly modified form of gas and air inlet valve and operating lever therefor which I prefer to employ in place of the form shown in detail in Fig. 7. In this construction the valve casing O is much the same as that shown in Fig. 7, except that the gas is admitted at the top, and a horizontally movable valve o is employed having a compression spring $o^2$ encircling its stem $o'$. The valve operating lever $O'$ is pivoted at $o^3$ to the casing and has an arm $o^4$ which engages a rod $o^5$ which forms a continuation of the valve stem. When the lever is depressed by one of the eccentric rods, the valve will be pushed inward and gas will be permitted to flow into the inlet port. The air valve $o^6$ is of the same construction as that shown in Fig. 7.

I do not desire to be limited to the exact details of construction herein shown and described, as variations may be made therein without departing from the spirit of my invention.

What I claim, and desire to secure by Letters Patent, is—

1. In an explosive engine the combination with a pair of cylinders each having two chambers of different diameters, of a piston for each cylinder having portions working in each chamber, the crank shaft connected with each of said pistons by a single connecting rod, valves controlling the supply of explosive material to each chamber, valves controlling the exhaust port of each chamber, means for operating said valves and devices for igniting the charge in each chamber successively, substantially as described.

2. In an explosive engine, the combination with a pair of cylinders each having two chambers of different diameters, of a piston for each cylinder having portions working in each chamber, the crank shaft connected with said pistons, valves controlling the supply of explosive material to each chamber, valves controlling the exhaust port of each chamber, a shaft operated from the driving shaft operatively connected with said supply and exhaust valves, and devices for igniting the charge in each chamber successively, connected with said shaft, substantially as described.

3. In an explosive engine, the combination with the passages, for supplying explosive material to the explosion chambers, of valves located therein, levers connected therewith, eccentric rods having hooked portions for engaging the said levers during portions of their movements, and devices connected with a centrifugal governor, for partially removing said hooked portions from engagement with said levers, thereby lessening the movement of said valves, substantially as described.

4. In an explosive engine, the combination with the cylinders having each two chambers of different diameters, of a piston for each cylinder having portions working in each chamber, an exhaust port for each chamber, provided with a controlling valve, a valve controlling shaft provided with cams for opening one of said valves at each stroke of the pistons, substantially as described.

5. In an explosive engine the combination with passages for supplying explosive material to the explosive chambers, of valves located therein, levers connected therewith, eccentric rods having hooked portions for engaging the said levers during portions of their movements, said rods being provided with inclined surfaces, a slide provided with devices for engaging said inclined surfaces for partially removing said hooked portions from engagement with said levers, and a centrifugal governor operatively connected with said slide, substantially as described.

In testimony whereof I affix my signature in presence of two witnesses.

JESSE WALRATH.

Witnesses:
 JAMES V. ROHAN,
 FRANK K. BULL.